United States Patent [19]

Grönnevik

[11] Patent Number: 5,622,444

[45] Date of Patent: Apr. 22, 1997

[54] CONNECTING ARRANGEMENT

[75] Inventor: Oddbjörn Grönnevik, Nesbru, Norway

[73] Assignee: Krupp Kautex Maschinenbau GmbH, Bonn, Germany

[21] Appl. No.: 456,591

[22] Filed: Jun. 1, 1995

[30] Foreign Application Priority Data

Jun. 3, 1994 [DE] Germany ............... 44 19 371.8

[51] Int. Cl.⁶ .................................................. B25G 3/00
[52] U.S. Cl. ........................... 403/316; 403/292; 403/294; 403/330; 403/353
[58] Field of Search ...................... 403/231, 242, 403/292, 294, 329, 316, 330, 353, 354

[56] References Cited

U.S. PATENT DOCUMENTS

| | | | |
|---|---|---|---|
| 3,072,938 | 1/1963 | Phaneuf | 403/329 X |
| 4,664,548 | 5/1987 | Brinkman | 403/231 X |
| 4,850,735 | 7/1989 | Hansen et al. | 403/330 |

FOREIGN PATENT DOCUMENTS

| | | |
|---|---|---|
| 3121565A1 | 12/1982 | Germany . |
| 3741229C1 | 9/1989 | Germany . |
| 9308051 | 9/1993 | Germany . |

OTHER PUBLICATIONS

German Office Action Regarding P 44 19 371.8; 2 pages.

*Primary Examiner*—Blair Johnson
*Assistant Examiner*—Bruce A. Lev
*Attorney, Agent, or Firm*—Panitch, Schwarze, Jacobs & Nadel, P.C.

[57] ABSTRACT

In a connecting arrangement on first and second parts which are to be connected, the first part carries an extension and the second part has an opening into which the extension engages when the parts are in the connected position. The extension has an aperture. A projection extending into the opening in the second part engages in the aperture when the parts are in the connected position. An arresting tongue projects into the aperture in the extension. When the two parts are brought together the arresting tongue is pivoted by the projection into the position in which it bears against a region of the boundary wall defining the opening in the first part and thus secures the parts in the connected position.

18 Claims, 5 Drawing Sheets

CONNECTING ARRANGEMENT

BACKGROUND OF THE INVENTION

Situations frequently occur in which there is a need for two parts to be securely connected together. As a typical example, attention may be directed to German utility model No 93 08 051.4 in which a container has side wall portions which are pivotable relative to the bottom of the container and which are provided with connecting means in order to connect the side wall portions together in their operative position and secure them in that position. For that purpose, the one side wall portion is provided at its end with at least one extension which engages into an opening in the other side wall portion to form the connection. In that assembly, arranged within the opening in the other side wall portion is a projection which extends substantially in the main plane of the opening and which, in the operative position of the portions, engages into an aperture disposed on the extension of the other portion of the container. That provides for a positively locking connection between the two portions which are to be connected together. In order to prevent unintentional disengagement of the connection between the two portions, that container also includes, between the side wall portions and/or between them and the bottom, a fixing device which exerts a biasing force operative in a direction such as to maintain the connection. To make the connection between the side wall portions of the container, the co-operating connecting elements are required to be elastically deformed, and that necessitates a certain level of skill. A certain amount of force also has to be applied to produce the elastic deformation effect. Furthermore, there is the risk, when external forces act on the container, for example in transportation thereof, that the biasing forces which are intended to maintain the portions in the connected condition might be overcome so that the connection is accidentally released.

SUMMARY OF THE INVENTION

An object of the present invention is to provide a connecting arrangement for connecting first and second parts together, which is so designed as to overcome the above-indicated disadvantages.

Another object of the present invention is to provide a connecting arrangement for first and second parts which are to be connected together, wherein only few relative movements as between the two parts are required to connect them together, while positioning of the co-operating components of the connecting arrangement for producing a positively locking interconnection effect takes place more or less automatically, or at any event without the need for deformation of the connecting elements to bring them into effect, with the concomitant action of forces specifically for that purpose.

Still another object of the present invention is to provide a connecting arrangement for connecting first and second parts together, which can afford a secure positively locking connecting relationship between the parts in the operative condition of the arrangement, by a simple latching action requiring little skill on the part of an operator.

A still further object of the present invention is to provide a connecting arrangement for connecting first and second parts, which is adapted to afford a connection which if necessary can be released without major difficulty but which is not easily unintentionally released.

In accordance with the principles of the present invention the foregoing and other objects are achieved by a connecting arrangement on first and second parts to be connected together, comprising on the first part an extension at a region thereof which in the connected condition of the parts is towards the second part. Provided on the second part at a region thereof which in said connected condition is towards the first part is an opening into which said extension is engaged in the connected condition of the parts. The extension has an aperture therein, and a projection disposed in the opening in the second part is engageable into the aperture in the extension, in the connected condition of the parts. An arresting tongue is disposed in the region of the aperture of the extension and is arranged in such a way that the arresting tongue is pivotable by the projection into a position of bearing against a region of the boundary wall defining the opening in the second part, thereby to secure the parts in the connected condition.

As will be seen in greater detail from preferred embodiments described hereinafter, the operation of making the connection between the first and second parts to be joined together only requires two relative movements as between the parts. In the course of the first relative movement the extension on the first part is inserted into the opening in the second part. The second relative movement is a subsequent transverse movement in which a condition of positively locking relationship is produced as between the two parts, while at the same time the co-operating components of the connecting arrangement are locked together by the action of the arresting tongue which is pivoted into its operative position in the course of the second relative movement. In this respect there is no need for the components or parts which co-operate with each other to be subjected to substantial loadings of tensile, compressive, flexural or torsional nature. The extent of each of the two movements involved in making the connection can be very slight, for example of the order of magnitude of a few centimeters. After the connection has been made, there is also no need for additional forces of significant magnitudes for maintaining the first and second parts in the connected-together condition.

Further objects, features and advantages of the present invention will be apparent from the following description of preferred embodiments thereof.

DESCRIPTION OF THE PREFERRED EMBODIMENTS

Figure 1:
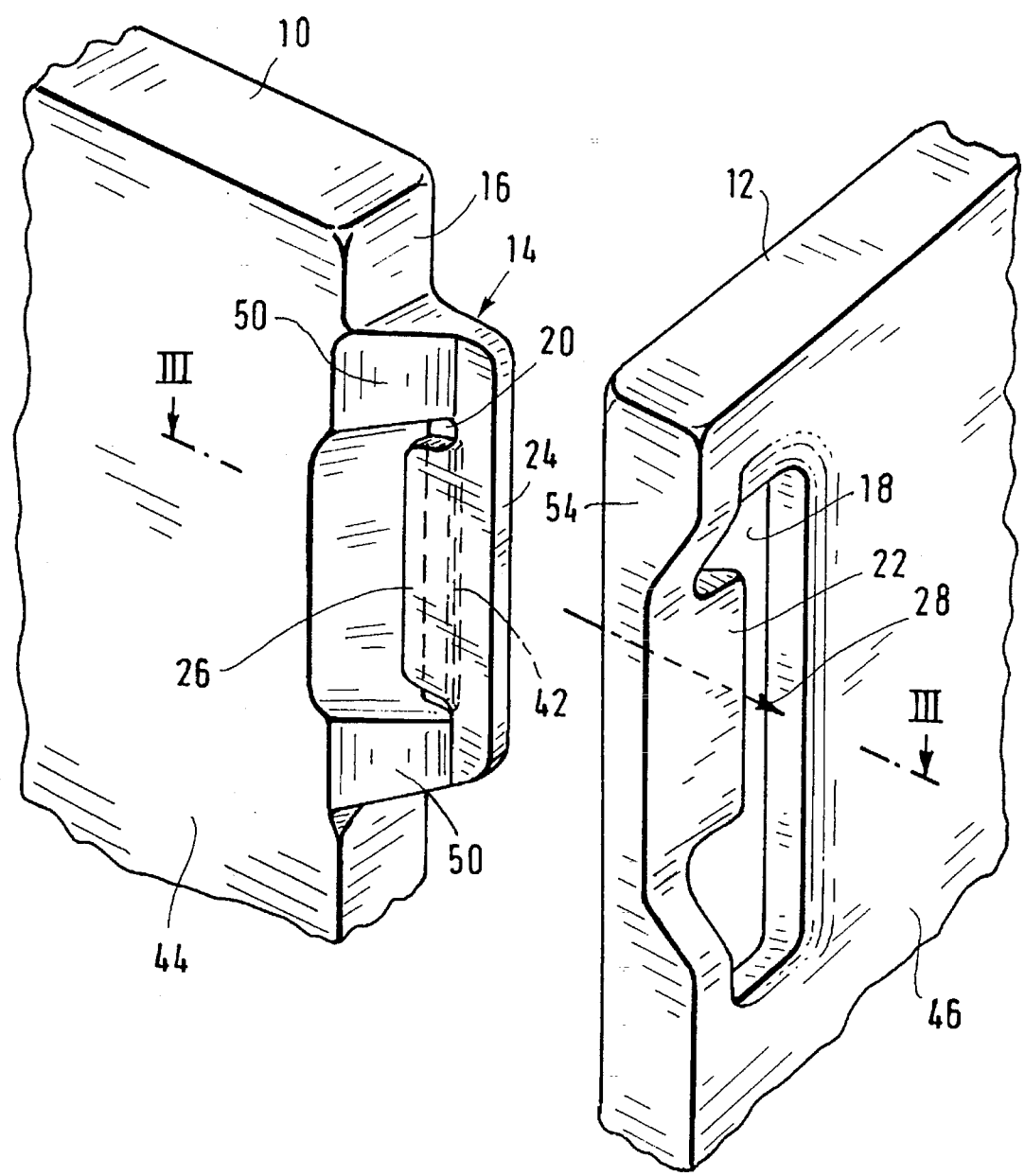
FIG. 1 is a perspective view of first and second parts which are to be connected together and which are still disposed at a spacing from each other, before moving into the connected position.

Referring firstly to FIGS. 1 through 6 showing a first embodiment of the invention, the first and second parts 10, 12 which are to be connected together by the connecting arrangement according to the invention may be for example the side wall portions of a box-like container, a drawer or a similar article which can also be provided with a bottom although this is not shown in the drawing. The two parts 10 and 12 may however also be components of an article of furniture, a container for documents or files or any other item.

Irrespective of the specific nature of the first and second parts 10 and 12 which are to be connected together by the connecting arrangement according to the invention, the first part 10 is provided with an extension 14 which is disposed on the first part 10 at the end thereof and which can project beyond the end face 16 of the first part 10 in a direction towards the second part 12 when the first and second parts 10 and 12 are in the position shown in FIG. 1 in which they are being offered for interconnection to each other. At its end region which, in the connected position of the two parts, is towards the first part 10, the second part 12 is provided with an opening 18, the size and shape of which are adapted to those of the extension 14 of the first part 10, in a manner yet to be described herein.

Figure 3:
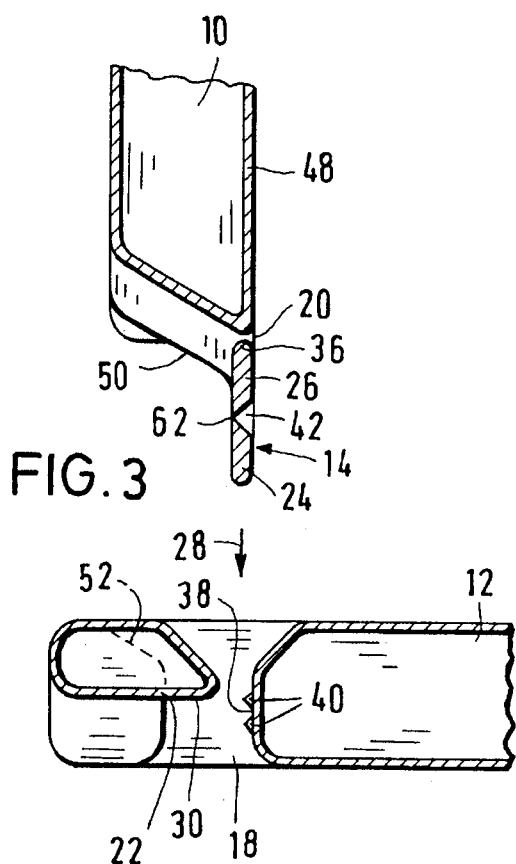
FIG. 3 is a view in section taken along line III—III in FIG. 1.
Figure 4:
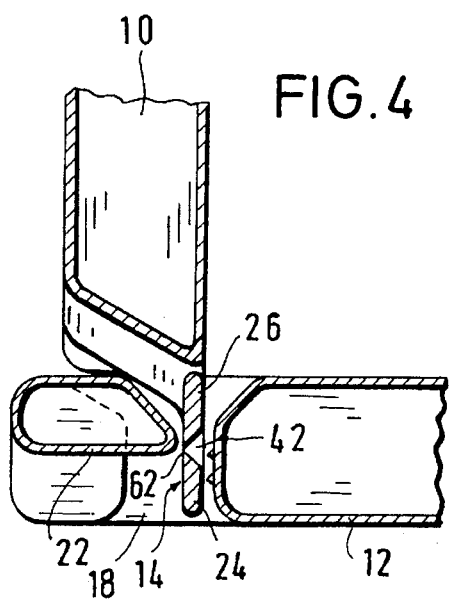
FIG. 4 is a view corresponding to FIG. 3, but showing the two parts to be connected together in a first intermediate position in the course of the connection being made.

The extension 14 on the first part 10 is provided with an aperture 20 therethrough so that the extension 14 is approximately in the configuration of a loop-like portion. Provided on the wall of the second part 12, which defines the opening 18, is a projection 22 which projects into the opening 18 and which is so adapted in respect of its arrangement and size to the aperture 20 in the extension 14 that the projection 22 can be introduced into the aperture 20. Reference numeral 24 denotes an outer leg-like portion defining a part of the periphery of the aperture 20. Provided on the portion 24 on the inside thereof is an arresting tongue 26 which projects into the aperture 20 and thus towards the end wall 16 of the part 10. The arresting tongue 26 is so carried on the portion 24 of the aperture 20 that it is pivotable relative to the portion 24 from a starting or rest position as shown in FIGS. 1, 3 and 4, in which it extends substantially in a plane defined by the portion 24 or a plane parallel thereto. In the case of the embodiment shown in FIGS. 1 through 6, in its starting position the arresting tongue 26 is disposed in the plane of the extension 14, as can be seen in particular from FIGS. 3 and 4.

In order to form the connection between the two parts 10 and the first part 10 is firstly relatively displaced in the direction indicated by the arrow 28 in FIG. 1 from the position shown in FIGS. 1 and 3 into a first intermediate position as shown in FIG. 4 in which the extension 14 is positioned in the opening 18 in such a way that the arresting tongue 26 is arranged opposite the projection 22. As can be seen in particular from FIGS. 3 through 6, the projection 22, at its side which is towards the opening 18, is of a somewhat wedge-shaped configuration in cross-section with the boundary surface 30, that is remote from the first part 10, extending substantially perpendicularly to the direction 28 of displacement of the part 10, in the region of the opening 18.

Figure 5:
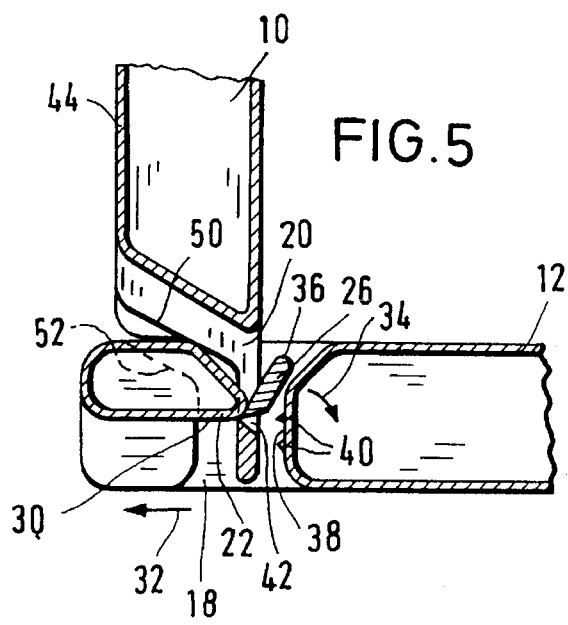
FIG. 5 is a view corresponding to FIG. 4, showing the parts in a second intermediate position in the course of the connection being made.
Figure 6:
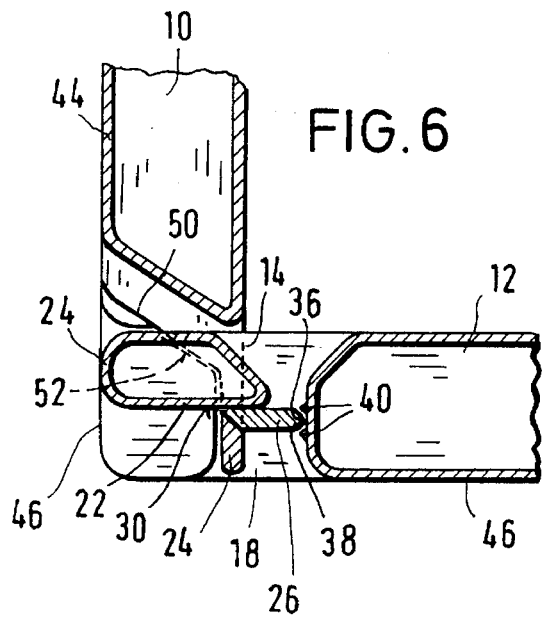
FIG. 6 shows a view in section taken along line VI—VI in FIG. 2, showing the two parts in the connected position.

After the parts 10 and 11 have reached the position shown in FIG. 4 in the course of the connection between the parts 10 and 11 being made, the part 10 is relatively displaced with respect to the part 12 in the direction indicated by the arrow 32 in FIG. 5. FIG. 5 shows an intermediate position in the course of that displacement. It will be seen therefrom that the projection 22 comes to bear against the arresting tongue 26 and pivots the latter approximately in the direction indicated by the arrow 34 in FIG. 5, in such a way that, at the end of the movement of the part 10 in the direction indicated by the arrow 32 in FIG. 5, the arresting tongue 26 occupies the position which is shown in FIG. 6 and in which the arresting tongue 26 is disposed approximately perpendicularly to its starting position as shown in FIGS. 3 and 4. In this operative position of the arresting tongue 26, the free edge 36 of the arresting tongue 26 comes to bear against the region 38, which is opposite the projection 22, of the boundary wall defining the opening 18. That wall region 38 is provided with a seating means in the form of at least first and second retaining projections 40, the spacing of which from each other approximately corresponds to the width or thickness of the arresting tongue 26 in the region of its free edge 36.

Figure 2:
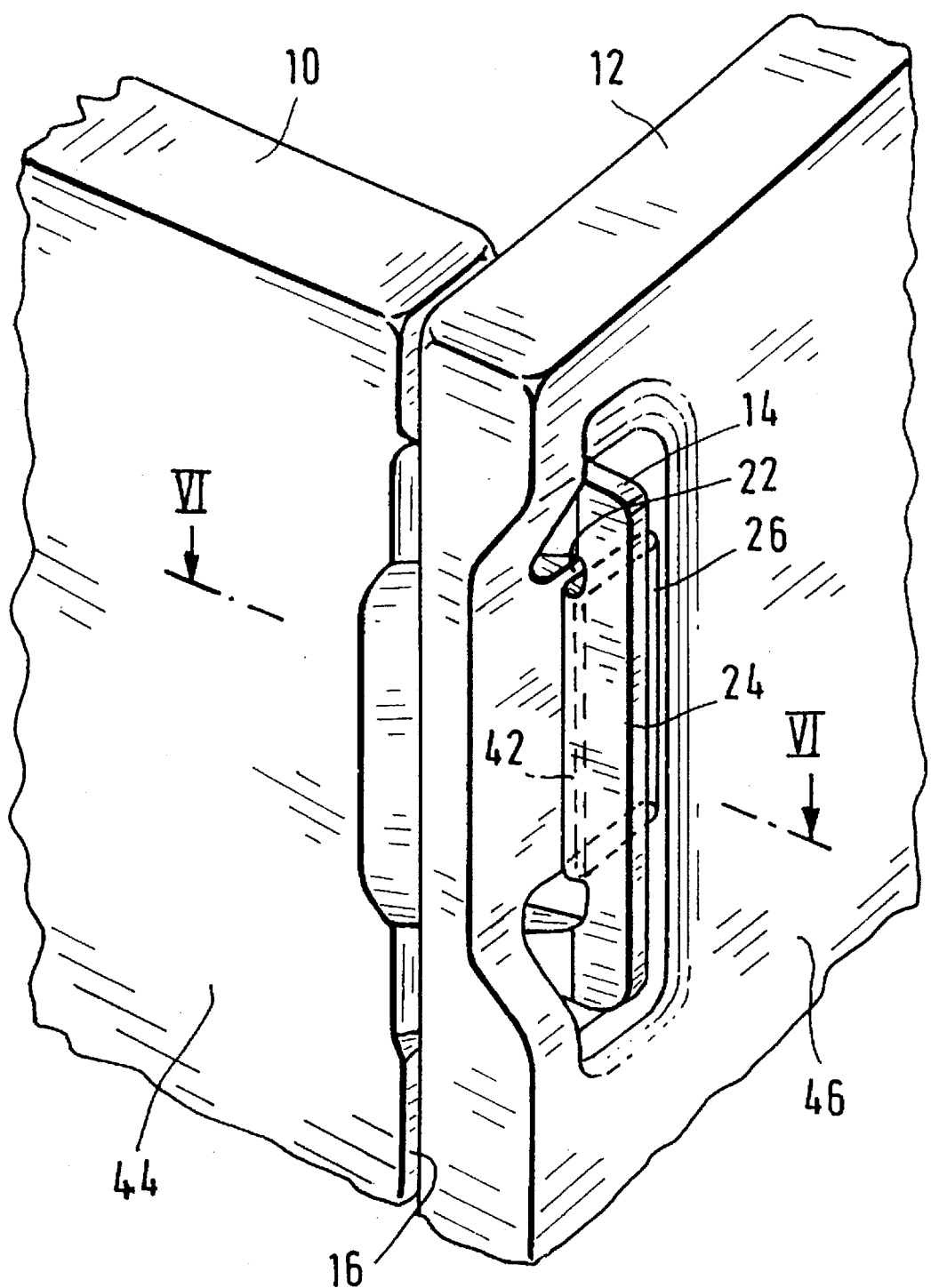
FIG. 2 is a view corresponding to FIG. 1 of the parts after the connection has been made therebetween.

Looking now at FIGS. 2 and 6, it will be seen therefrom that, when the two parts 10 and 12 are in the connected position, the outer boundary portion 24 of the extension 14 engages behind the projection 22 within the opening 18 so that there is a positively locking connection between the portion 24 and thus the part 10 on the one hand, and the projection 22 on the second part 12, on the other hand. That connection could only be released if the first part 10 is displaced relative to the second part 12 in the opposite direction to the direction indicated by the arrow 32, in order thereby to bring the portion 24 out of engagement with the projection 22. However, a movement of that kind is prevented by the arresting tongue 26 which has been pivoted into its operative position as shown in FIG. 6 and which thus bears against the inner boundary wall 38 of the opening 18 and thus presses the extension 14 on the first part 10 against the inner boundary or inwardly facing wall surface of the opening 18. Therefore, in its operative position as shown in FIG. 6, the arresting tongue constitutes an arresting means which at the same time can also serve to ensure that the two parts 10 and 12 bear firmly against each other, with at least substantially no clearance between the two parts 10 and 12 in the connecting region thereof. A further aspect which also contributes to ensuring that the two parts 10 and 12 bear firmly against each other is that, in the connected position of the two parts 10 and 12, the arresting tongue 26 bears against the surface 30 of the projection 22, thereby providing a certain degree of bracing effect between the two parts 10 and 12. That applies in particular when the parts which cooperate in this situation are made from plastic material and more especially a thermoplastic material which does in any case have a certain degree of elastic deformability.

In order to facilitate the pivotal movement of the arresting tongue 26 from the position shown in FIGS. 1, 3 and 4 into the operative position shown in FIGS. 2 and 6, the arresting tongue 26 is only connected to the outer portion 24 of the extension 14 by way of a thin film 62 of material, which is formed by a generally V-shaped notch 42. The thin film 62 and the V-shape of the notch 42 thus provide that pivotal movement of the arresting tongue 26 from its initial position shown in FIGS. 1, 3 and 4 into its operative position of FIGS. 2 and 6 does not require the application of particularly high forces. The pivotal movement of the arresting tongue 26 and the way in which the generally V-shaped notch 42 facilitates such movement can be clearly seen from FIGS. 4 through 6. The side wall surfaces defining the notch 42 for facilitating the pivotal movement of the arresting tongue 26 preferably include an angle of 90°. It will further be seen that the inclined wall surfaces defining the notch 42 form an abutment configuration which is such as to ensure that, when the usual forces are applied, the arresting tongue 26 does not pivot beyond its effective position as shown in FIG. 6, in the direction indicated by the arrow 34 in FIG. 5. This therefore means that the operative position of the arresting tongue 26 can also be established by suitable selection of the angle formed by the configuration of the notch 42.

The wall thickness of the extension 14 must be matched to the width of the opening 18 and accordingly must be of such a size that the extension 14 can be passed through between the projection 22 and the region 38 of the oppositely disposed wall surface. For that purpose the extension 14 can be of smaller thickness than the part 10 itself, as can be clearly seen from the drawing. As, in the connected position of the parts 10 and 12 the position of the extension 14 fixes the position of the part 10 relative to the part 12, it may be desirable for the extension 14 to be so disposed on the part 10 or more specifically the end face 16 thereof that, in the connected position of the parts 10 and 12, they assume a given position, for example such that, as shown in FIGS. 2 and 6, the two parts 10 and 12 are delimited on the outside and possibly also the inside thereof by generally smooth surfaces, with no portions projecting therebeyond. Thus for example the outer lateral surface of the first part 10, as indicated by reference numeral 44 in FIGS. 5 and 6, lies flush with the end face as indicated at 46 of the second part 12, when the parts 10 and 12 are in the connected position. Furthermore, in this respect, the length of the extension 14 is so selected that, in the connected position of the parts 10 and 12 as shown in FIGS. 2 and 6, the extension 14 does not project beyond the outer lateral surface of the part 12, as indicated at 46 in FIG. 6.

It will be noted that, in the embodiment shown in FIGS. 1 through 6, the extension 14 is aligned with the inward surface as indicated at 48 in FIG. 3 of the first part 10. The transition between the extension 14 and the outer surface 44 of the first part 10 is made by way of inclined surfaces as indicated at 50, the positioning of the surfaces 50 being particularly clearly visible in FIG. 1. In the connected position of the parts 10 and 12 the inclined surfaces 50 can bear against correspondingly inclined surfaces as indicated at 52 in FIGS. 3, 5 and 6, of the wall portion, indicated at 54 in FIG. 1, defining the opening 18. The co-operation of the inclined surfaces 50 and 52 thus also contribute to forming a good, substantially play-free connection between the two parts 10 and 12.

It has already been mentioned hereinbefore that, in the connected position of the parts 10 and 12 as shown in FIGS. 2 and 6, the extension 14 on the first part 10 does not project beyond the outer side wall 46 of the second part 12. In order to achieve that, the projection 22 is arranged within the opening 18 in such a way that its surface 30 which co-operates with the outer portion 24 of the extension 14 to produce the positively locking connection between the parts 10 and 12 is arranged in such a way as to be displaced inwardly relative to the outer lateral wall surface 46 of the second part 12. That can be achieved in a simple manner by the adoption of a configuration in which, as can be seen in particular from FIGS. 1 and 2, the outer region defining the opening 18, which bears the projection 22, is thinner than the part 12, and is arranged displaced inwardly, that is to say in a direction towards the first part 10, by way of the inclined surfaces 52.

Depending on the materials used and also the dimensions of the co-operating portions, more especially the arresting tongue 26 and the retaining projections 40, the connection between the two parts 10 and 12 can be released again, by a procedure whereby the arresting tongue 26 is pivoted out of the position shown in FIG. 6 into the position shown in FIG. 5 again, for example using a tool, thereby overcoming the retaining effect of the retaining projections 40 which resist such movement on the part of the arresting tongue 26. Thereupon, the part 10 can be moved relative to the part 12 in the opposite direction to the direction indicated by the arrow 32, to release the part 10 from its condition of positively locking engagement with the part 12.

It will be noted that a releasable connection of that kind may be desirable and appropriate for example in the case of a box-like container whose side wall portions, when the container is empty, are pivotable into a position in which they are aligned with the bottom of the container. On the other hand, when suitable materials are adopted and when the co-operating portions are appropriately dimensioned, the connection is so good that it can also be used in situations in which release of the connection is neither intended nor required. At any event the connection is extremely simple to make as only two movements of the parts to be connected together are required for that purpose, namely the movement in the direction indicated by the arrow 28 in FIG. 3 and the direction transversely relative thereto in the direction indicated by the arrow 32 in FIG. 5, whereupon it is then only necessary possibly to check and if appropriate correct the position of the arresting tongue 26. A further advantage is that, particularly when the parts including the connecting portions are made from plastic material, they can generally be produced in one working operation.

Reference will now be made to FIGS. 7 through 11 showing a further embodiment of the connecting arrangement according to the invention which also enjoys the above-discussed advantages of the first embodiment. The embodiment shown in FIGS. 7 through 11 is the same in terms of its essential components as the embodiment shown in FIGS. 1 through 6 so that the same parts are also denoted by the same references but increased by 100 in the description of the second embodiment. It will be seen from a review of FIGS. 7 through 11 that, whereas the embodiment of the connecting arrangement shown in FIGS. 1 through 6 provides that the two parts extend substantially in right-angled relationship with each other in the connected position thereof, the connecting arrangement shown in FIGS. 7 through 11 serves to form a connection between two parts 110 and 112 which are arranged to extend substantially in the same direction in the connected position and are possibly also aligned with each other. The consequence of that is that the opening 118 on the second part 112 for receiving the extension 114 on the first part 110 is disposed on the second part 112 at the end thereof as indicated at 156 in FIG. 8, whereas the corresponding opening 18 on the second part 12 in the first embodiment described above with reference to FIGS. 1 through 6 extends substantially transversely with respect to the longitudinal extent of the second part 12. Accordingly, the projection 122 which, together with the extension 114 or the outer leg-like portion defining same, provides for the positively locking connection between the two parts 110 and 112 in the connected position thereof, extends transversely to the longitudinal extent of the second part 112. Accordingly the relative movement as between the parts 110 and 112 in the direction indicated by the arrow 128 in FIG. 7, by virtue of which movement the extension 114 is introduced into the opening 118, also takes place substantially parallel to the longitudinal extent of the second part 112 when the latter is of a substantially linear nature. It will be noted however that this is not necessary either in regard to the first part 110 or in regard to the second part 112. A corresponding consideration also applies in regard to the parts 10 and 12 of the first embodiment described above.

Figure 7:
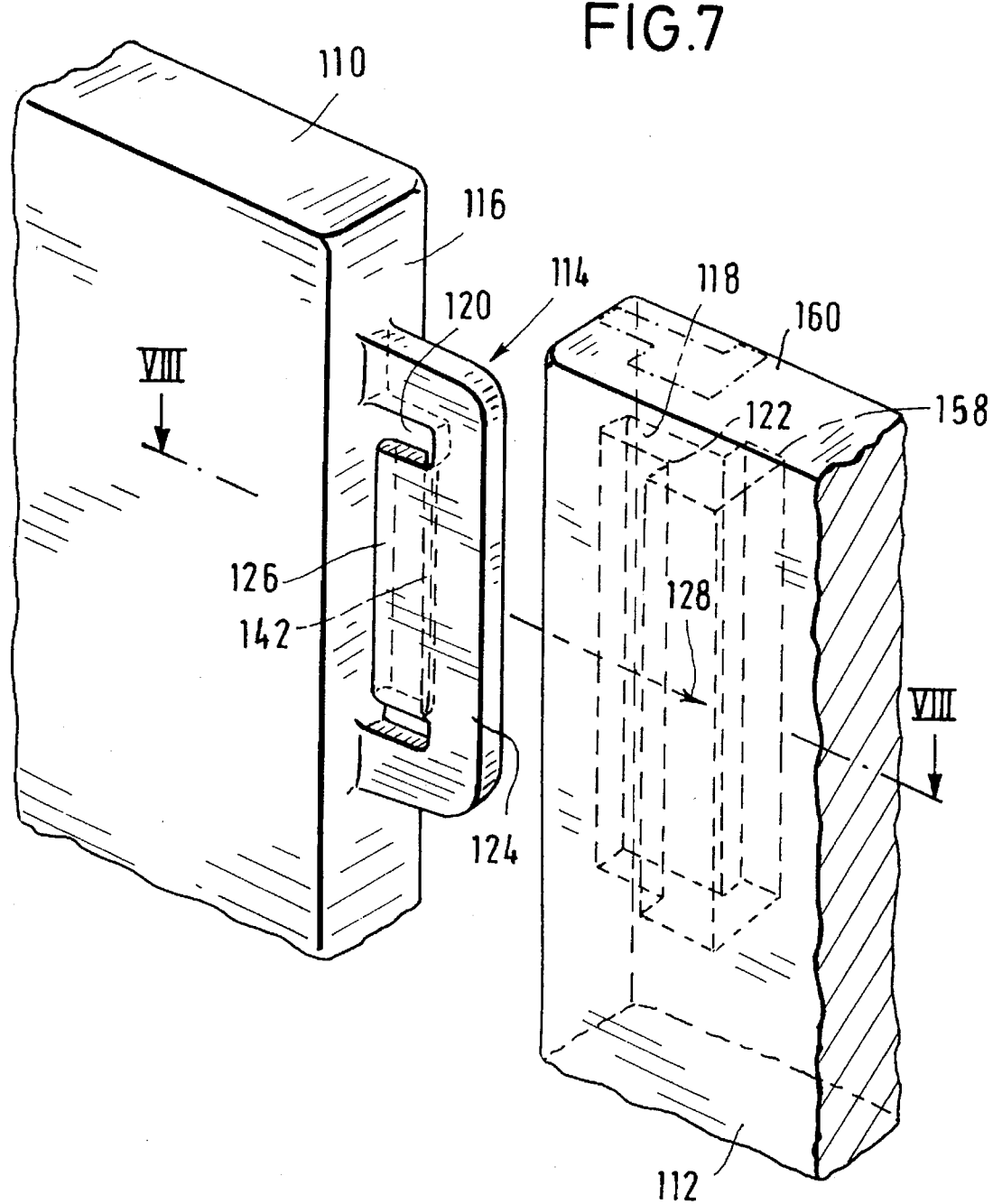
FIG. 7 is a view corresponding to FIG. 1 of a second embodiment of the invention.
Figure 8:
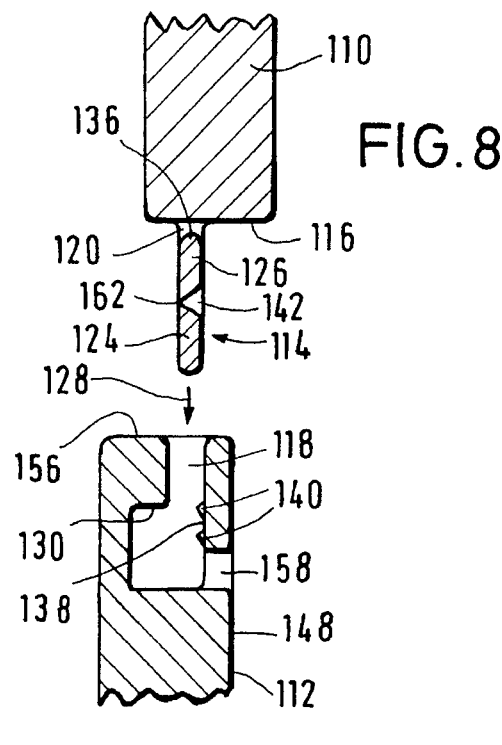
FIG. 8 is a view in section taken along line VIII—VIII in FIG. 7.
Figure 9:
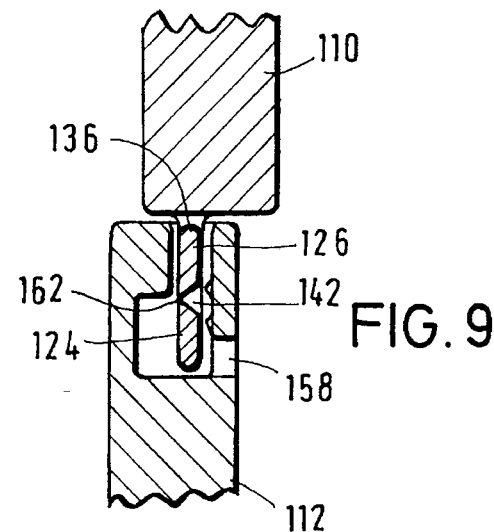
FIG. 9 is a view corresponding to FIG. 8 but showing the two parts to be connected together in a first intermediate position in the course of the connection being made.

The procedure shown in FIGS. 8 through 11 in regard to making the connection between the parts 110 and 112 essentially corresponds to that shown in FIGS. 3 through 6. That is to say, firstly the first part 110 is moved by a relative movement in the direction indicated by the arrow 128 in FIG. 7 and FIG. 8 so that the extension 114 moves into the opening 118 in the second part 112 until the position shown in FIG. 9 is reached. The first part 110 is then displaced transversely relative to the second part 112 in the direction indicated by the arrow 132 in FIG. 10, in the course of which movement the arresting tongue 126 is acted upon by the projection 122 which can also be viewed as a constriction in terms of the width of the opening 118. When that happens, the arresting tongue 126 is pivoted by way of the intermediate position shown in FIG. 10 into the final position shown in FIG. 11 in which the arresting tongue 126 has its free edge 136 bearing against the wall surface 138 which defines the opening 118. In that way the arresting tongue 126 locks the extension 114 and therewith the first part 110 to the second part 112.

Figure 10:
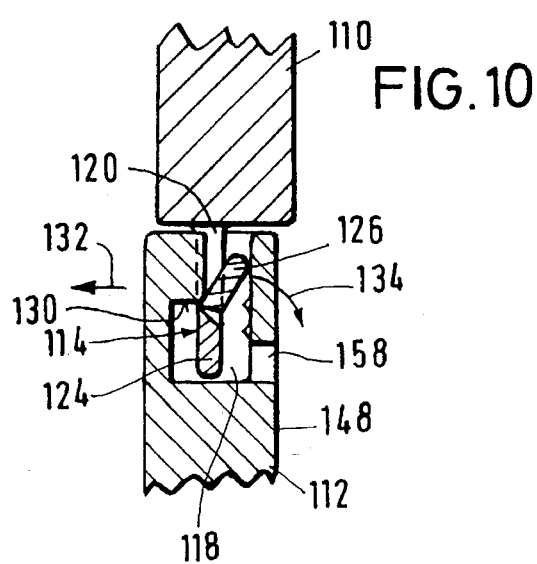
FIG. 10 is a view corresponding to FIG. 9 showing the two parts in a second intermediate position in the course of the connection being made.

The arrangement of the extension 114 on the end face 116 of the first part 110 is determined by the position of the opening 118 on the second part 112, the extent of the relative transverse displacement in the direction indicated by the arrow 132 in FIG. 10, and the final position of the first part 110 relative to the second part 112. It will be seen that, in the case of the embodiment shown in FIGS. 7 through 11, the two parts 110 and 112 are aligned in their connected position, but this is not necessary in every case.

Figure 11:
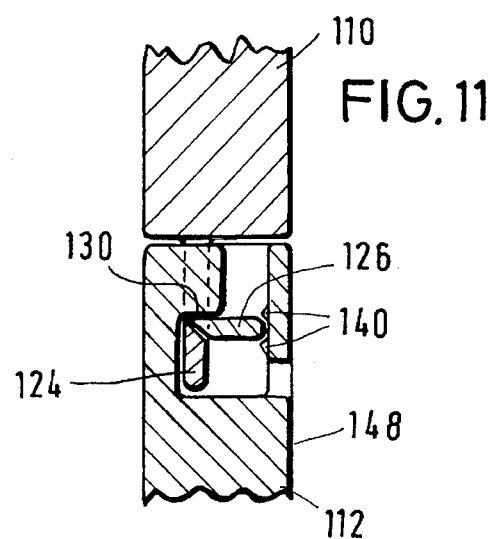
FIG. 11 shows the two parts in the connected position.

The opening 118 is extended into a lateral aperture indicated at 158 in FIGS. 8 through 10, in the lateral surface 148 of the second part 112. That can be governed by the conditions of manufacture of the components. On the other hand, an aperture 158 of that kind is often desirable in order possibly to afford access to the arresting tongue 26 when it has been pivoted into its operative position as shown in FIG. 11 so that the arresting tongue 126 can be moved out of its operative arresting position again, by a pivotal movement in the opposite direction to that indicated by the arrow 134 in FIG. 10. This will initially be possible only with simultaneous elastic deformation of the arresting tongue 126 as, in its operative arresting position, the arresting tongue 126 normally bears against the surface 130 of the projection 122. However, as soon as the arresting tongue 126 is loosened somewhat, the connection could be completely released by suitable movement of the two parts 110 and 112, as in the case of the embodiment shown in FIGS. 1 through 6. If necessary however the lateral aperture 158 can also be utilized to move the arresting tongue 126 into its operative position shown in FIG. 11, possibly using a tool for that purpose, in the course of the pivotal movement of the arresting tongue and in particular in the final phase of that movement, and/or to cause the free edge 136 of the arresting tongue 126 to engage into the seating means which is formed for example by the two retaining projections 140.

It will be appreciated that it is also possible however, alternatively or possibly also additionally, for the opening 118 to be extended to the upwardly facing end face as indicated at 160 in FIG. 7, of the second part 112, that extension of the opening 118 being indicated by the dash-dotted line in FIG. 7, in order thereby to afford access to the opening 118 from the end face 160.

It will be noted from the foregoing description of the embodiments of the connecting arrangement according to the invention that the two parts 10, 12 and 110, 112 can be connected together by only a small number of relative movements between the two parts, with positioning of the co-operating components of the connecting arrangement for producing a positively locking connection between the parts occurring more or less automatically, and at any event without the necessity for deformation of the components of the connecting arrangement, such as to require particular force to be applied thereto, in order to bring them into a condition of engagement with each other. The connection can be disengaged without involving major difficulty, not least because the positively locking connection does not involve a portion on one part being simply bent or wrapped around a portion on the other part, but involves a latching effect which ensures a firm hold between the parts to secure them in position relative to each other.

It will be appreciated that the above-described embodiments of the invention have been set forth solely by way of example and illustration of the principles of the invention and that various other modifications and alterations may be made therein without thereby departing from the spirit and scope of the invention.

What is claimed is:

1. A connecting arrangement on first and second parts which are to be connected together, comprising: on the first part, an extension at a region which in the connected position of the parts is towards the second part; and on the second part, at a region which in said connected position is towards the first part, an opening into which the extension on the first part is engaged in said connected position of the parts, the opening having a boundary wall; an aperture in the extension; a projection disposed in the opening in the second, part and adapted to engage into the aperture in the extension on the first part in said connected position of the parts; an arresting tongue in the region of the aperture in the extension, the extension and the arresting tongue being insertable into the opening, upon movement of the first part toward the second part, and the arresting tongue being pivotable by the projection from a first, inserted position, upon movement of the first part relative to the second part in a direction transverse to a direction of insertion of the extension into the opening, to a second, securing position in which the arresting tongue is displaced and bears against a region of the boundary wall of the opening in the second part to secure the parts in the connected position.

2. A connecting arrangement as set forth in claim 1 wherein the extension has a portion defining a region of said aperture and wherein the arresting tongue is disposed on said region of said aperture.

3. A connecting arrangement as set forth in claim 1 wherein in its pivoted position of securing the parts in said connected position the arresting tongue extends substantially perpendicularly to the direction in which it had been moved into the opening.

4. A connecting arrangement as set forth in claim 1 wherein in its pivoted position of securing the parts in said connected position the arresting tongue is displaced to a position substantially perpendicular to a plane in which the extension on the first part lies.

5. A connecting arrangement as set forth in claim 1 wherein the first part which has said extension, for making a positively locking connection with the second part having said opening, is displaceable relative to said second part in a direction towards said projection in said opening, whereby the arresting tongue is pivoted by said projection in a direction towards its position of securing the parts in the connected position.

6. A connecting arrangement as set forth in claim 1 including in said opening a seating means into which a free end portion of the arresting tongue is adapted to pivot in its position of securing the parts in the connected position.

7. A connecting arrangement as set forth in claim 1 wherein at least the arresting tongue on the extension comprises plastic material.

8. A connecting arrangement as set forth in claim 7 wherein said plastic material is a thermoplastic material.

9. A connecting arrangement as set forth in claim 1 wherein said parts are arranged to extend substantially in right-angled relationship with each other in the connected position.

10. A connecting arrangement as set forth in claim 1 wherein said parts are arranged to extend substantially linearly in the connected position.

11. A connecting arrangement as set forth in claim 1 wherein said extension extends substantially perpendicularly to a plane in which the second part lies in the connected position of the parts.

12. A connecting arrangement as set forth in claim 1 wherein the extension extends substantially parallel to a plane in which the second part lies in the connected position of the parts.

13. A connecting arrangement as set forth in claim 1 wherein the extension extends substantially parallel to a plane in which the first part lies.

14. A connecting arrangement as set forth in claim 1 wherein in the connected position of the parts, the projection in the opening of the second part engages through the aperture in the extension of the first part and bears against the arresting tongue when the tongue occupies the second, securing position to secure the parts in the connected position.

15. A connecting arrangement as set forth in claim 14 wherein said projection has a boundary surface which in the position of the arresting tongue in which it secures the parts in the connected position extends substantially parallel to a boundary surface of the arresting tongue, which is towards the projection.

16. A connecting arrangement as set forth in claim 1 wherein said projection is of a generally wedge-shaped configuration in cross-section.

17. An assembly including: first and second parts adapted to be connected together; on the first part an extension at a region thereof which in the connected condition of the parts is towards the second part; on the second part at a region thereof which in said connected condition is towards the first part, an opening adapted to receive the extension on the first part in said connected condition of the parts, the opening having boundary walls; an aperture in the extension; a projection in the opening in the second part and adapted to engage into the aperture in the extension of the first part in the connected condition of the parts; and an arresting tongue on the first in the region of the aperture in the extension, the arresting tongue and the extension being insertable into the opening, upon movement of the part toward the second part, and the arresting tongue being pivotable by the projection from a first position, after insertion of said extension into said opening, upon movement of the first part relative to the second part in a direction transverse to a direction of insertion of the extension into the opening, to a second, securing position in which said arresting tongue bear against a region of the boundary wall of the opening in the second part thereby to secure the parts in the connected condition.

18. A connecting arrangement on first and second parts which are to be connected together, comprising: on the first part, an extension at a region which in the connected position of the parts is towards the second part; and on the second part, at a region which in said connected position is towards the first part, an opening into which the extension on the first part is engaged in said connected position of the parts, the opening having a boundary wall; an aperture in the extension; a projection disposed in the opening in the second part and adapted to engage into the aperture in the extension on the first part in said connected position of the parts; an arresting tongue in the region of the aperture in the extension, the extension and the arresting tongue being insertable into the opening, upon movement of the first part toward the second part and, upon movement of the first part relative to the second part in a direction transverse to a direction of insertion of the extension into the opening, the extension being engageable behind the projection to positively lock the first and second parts together and the arresting tongue being pivotable by the projection from a first, inserted position, to a second, securing position in which the arresting tongue is displayed and bears against a region of the boundary wall of the opening in the second part to secure the first and second parts in the positively locked position.

* * * * *